(12) United States Patent
Lebrecht et al.

(10) Patent No.: US 9,501,779 B2
(45) Date of Patent: Nov. 22, 2016

(54) AUTOMATED THUMBNAIL SELECTION FOR ONLINE VIDEO

(71) Applicant: CARNEGIE MELLON UNIVERSITY, Pittsburgh, PA (US)

(72) Inventors: Sophie Lebrecht, Providence, RI (US); Michael Jay Tarr, Pittsburgh, PA (US); Deborah Johnson, San Bruno, CA (US); Mark Desnoyer, San Francisco, CA (US); Sunil Mallya Kasaragod, San Francisco, CA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 14/442,759

(22) PCT Filed: Nov. 14, 2013

(86) PCT No.: PCT/US2013/070088
§ 371 (c)(1),
(2) Date: May 14, 2015

(87) PCT Pub. No.: WO2014/078530
PCT Pub. Date: May 22, 2014

(65) Prior Publication Data
US 2015/0302428 A1   Oct. 22, 2015

Related U.S. Application Data

(60) Provisional application No. 61/796,555, filed on Nov. 14, 2012.

(51) Int. Cl.
| | | |
|---|---|---|
| *H04H 60/33* | (2008.01) |
| *H04H 60/45* | (2008.01) |
| *H04H 60/32* | (2008.01) |
| *G06Q 30/02* | (2012.01) |
| *G06F 3/01* | (2006.01) |
| *H04N 21/25* | (2011.01) |
| *H04N 21/442* | (2011.01) |
| *H04N 21/466* | (2011.01) |

(52) U.S. Cl.
CPC .......... *G06Q 30/0201* (2013.01); *G06F 3/015* (2013.01); *H04N 21/252* (2013.01); *H04N 21/44218* (2013.01); *H04N 21/4662* (2013.01); *H04N 21/4667* (2013.01); *G06F 2203/011* (2013.01); *G06Q 30/02* (2013.01)

(58) Field of Classification Search
USPC ...................................... 725/10–14
See application file for complete search history.

(56) References Cited

U.S. PATENT DOCUMENTS

| | | | | |
|---|---|---|---|---|
| 2002/0058867 A1* | 5/2002 | Breiter | ............... | A61B 5/0484 600/407 |
| 2004/0088289 A1* | 5/2004 | Xu | ................. | G06F 17/30811 |
| 2008/0065468 A1 | 3/2008 | Berg et al. | | |
| 2008/0255949 A1 | 10/2008 | Genco et al. | | |
| 2009/0112817 A1 | 4/2009 | Jung et al. | | |

(Continued)

OTHER PUBLICATIONS

International Search Report, dated Jan. 30, 2014, and Written Opinion issued in International Application No. PCT/US2013/070088.

*Primary Examiner* — Hunter B Lonsberry
(74) *Attorney, Agent, or Firm* — Saul Ewing

(57) ABSTRACT

Access is provided to optimal thumbnails that are extracted from a stream of video. Using a processing device configured with a model that incorporates preferences generated by the brain and behavior from the perception of visual images, the optimal thumbnail(s) for a given video is/are selected, stored and/or displayed.

26 Claims, 2 Drawing Sheets

(56) References Cited

U.S. PATENT DOCUMENTS

2010/0030714 A1* 2/2010 Bollano ............... G10L 17/26
                                                        706/12
2011/0038547 A1   2/2011  Hill
2011/0077996 A1   3/2011  Ahn et al.
2011/0119129 A1   5/2011  Pradeep et al.
2012/0101966 A1   4/2012  van Coppenolle et al.

* cited by examiner

AUTOMATED THUMBNAIL SELECTION FOR ONLINE VIDEO

CROSS-REFERENCE TO RELATED APPLICATIONS

This application is based on, and claims priority to PCT/US2013/070088, filed on Nov. 14, 2013, which claims priority to U.S. Provisional Application No. 61/796,555, filed on Nov. 14, 2012, the entire contents of which is fully incorporated herein by reference. This application is related to PCT Application No. PCT/US2013/028945, published as WO 2013/131104, the entire contents of which is incorporated fully herein by reference.

GOVERNMENT RIGHTS

This invention was made with government support under National Science Foundation NSFIIP1216835. The government has certain rights in this invention.

BACKGROUND OF THE INVENTION

For decades, psychologists regarded perception and affect as distinct processes. It was assumed that the perceptual system sees visual information and emotional networks evaluate affective properties. The applicant's research shows, however, that these processes are not so separable, and that some affective components are in fact intimately tied to perceptual processing (Lebrecht, S., Bar, M., Barrett, L. F. & Tarr, M. J. Micro-Valences: Perceiving Affective Valence in Everyday Objects. Frontiers in Psychology 3, (2012)). Applicant has shown that valence—the dimension of affect that represents positive to negative (Russell, J. A. A circumplex model of affect. Journal of personality and social psychology 39, 1161-1178 (1980))—is seen in the majority of visual information, and coded as part of the perceptual representation. Applicant has shown that valence perception is derived from a combination of low-level perceptual features and related associations, or highly similar features that results in an overall gist which the brain then outputs as a single valence "score" that influences choice behavior.

The second fundamental idea underlying this work is that valence does not need to be strong or obvious to exert an effect on behavior. Most researchers typically study strongly affective objects and scenes (Greenwald, A. G., McGhee, D. E. & Schwartz, J. L. Measuring individual differences in implicit cognition: the implicit association test. J Pers Soc Psychol 74, 1464-1480 (1998); Avero, P. & Calvo, M. G. Affective priming with pictures of emotional scenes: the role of perceptual similarity and category relatedness. Span J Psychol 9, 10-18 (2006); Calvo, M. G. & Avero, P. Affective priming of emotional pictures in parafoveal vision: Left visual field advantage. Cognitive, Affective, & Behavioral Neuroscience 8, 41 (2008); Rudrauf, D., David, O., Lachaux, J. P., Kovach, C. K., et al. Rapid interactions between the ventral visual stream and emotion-related structures rely on a two-pathway architecture. J Neurosci 28, 2793-2803 (2008); Colibazzi, T., Posner, J., Wang, Z., Gorman, D., et al. Neural systems subserving valence and arousal during the experience of induced emotions. Emotion 10, 377-389 (2010); Weierich, M. R., Wright, C. I., Negreira, A., Dickerson, B. C. & Barrett, L. F. Novelty as a dimension in the affective brain. Neuroimage 49, 2871-2878 (2010)). While this is helpful for anchoring affective perception, it tells little about the typical objects encountered in everyday life. Individual's perceive valence in almost all visual information that they encounter, and objects typically regarded as "neutral" by affective researchers in fact automatically generate the perception of a "micro"-valence. This work was confirmed by an integrated mind and brain approach that included a series of perceptual, cognitive, and neuroimaging paradigms. Applicant was able to successfully demonstrate that (a) one can measure an individual's perception of micro-valence, (b) it relates to choice, (c) it is coded by the same neural mechanisms that code for strongly affective objects, and (d) the valence is processed by regions that code exclusively for objects (Lebrecht, S. & Tarr, M. Defining an object's micro-valence through implicit measures. Journal of Vision 10, 966 (2010); Lebrecht, S., Bar, M., Sheinberg, D. L. & Tarr, M. J. Micro-Valence: Nominally neutral visual objects have affective valence. Journal of Vision 11, 856-856 (2011); Lebrecht, S., Johnson, D. & Tarr, M. J. [in revision] The Affective Lexical Priming Score. Psychological Methods).

Through behavioral experiments, Applicant has found that there is a strong consensus in valence perception across a constrained demographic. This remarkable consensus in the perception of objects previously regarded as "neutral" offers significant potential for the field of consumer behavior. The evidence that valence perception operates on a continuum that can be quantified was uncovered during a subsequent fMRI experiment. Of particular interest, Applicant found that the perception of micro-valence is coded by the same neural system that codes for strong valence. This suggests that valence strength may be organized topologically. The Region of Interest (ROI) analysis has also shown how the perception of valence varies as a function of percent signal change.

In recent years, the online video landscape has evolved significantly from primarily featuring user-generated content to delivering more premium-content videos such as TV episodes, news clips, and full-length movies identical to what a user would otherwise watch on TV. Growth in the amount of professionally-produced content available online has led to a parallel increase in video length, creating more opportunity for pre-roll and in-stream video ads; Advertisers have already started to take advantage. While YouTube® continues to dominate the online video market in terms of total videos viewed each month, for twenty-four consecutive months since June 2010, Hulu®, the leading platform for premium content, generated the highest number of video ad views every month according to comScore® ("ComScore Launches Video Metrix 2.0 to Measure Evolving Web Video Landscape." ComScore announces improvements to video measurement service and releases Video Metrix rankings for June 2010. Jul. 15, 2010. comScore. Web. 15 Jun. 2012, http://www.comscore.com/Press_Events/Press_Releases/2010/7/comScore_Launches_Video_Metrix_2.0_to_Measure_Evolving_Web_Video_Landscape). Since the number of long-form videos online is expected to continue to grow substantially in coming years, a similar increase in the number of in-stream video ads is likely.

While a massive market opportunity lies in the digital advertising space, the opportunity coming from the use of digital video in the web commerce industry should not be overlooked. Digital video is now being used for product demonstrations at the point of purchase, for example. As online spending and competition grows, these types of videos are already providing a competitive edge—internet retailers that offer product videos have seen increased sales and decreased returns for products with video descriptions. In 2009, the online shoe-selling powerhouse Zappos.com® reported increased sales ranging from 6-30% for products that had a video description (Changing the Way You Shop for Shoes. Interview with Zappos.com's Senior Manager Rico Nasol on how the retailer is using streaming video to boost sales. Video. Streaming Media West: FOXBusiness. com, Dec. 4, 2009. http://video.foxbusiness.com/v/3951649/changing-the-wayyou-shop-for-shoes/).

BRIEF SUMMARY OF THE INVENTION

In one aspect of the present disclosure, a method performed by one or more processing devices includes retrieving data for a video frame from a video stream that has the highest positive Affective Valence, and as such serves as the most effective representative thumbnail.

Embodiments of the disclosure can include one or more of the following implementations. Affective Valence, a signal generated during visual perception that informs choice and decision-making structures in the human brain, can be assessed experimentally using behavioral methods. Affective Valance can also be assessed using functional magnetic resonance imaging (fMRI).

In another aspect of the present disclosure, understanding that video frames do not have to generate a strong or arousing affective perception in order to be coded by the neural system that does represent strongly affective information is a fundamental insight for areas of industry that require images to communicate information and elicit behavior. Moreover, the ability to read out the relative valence perceptions directly from this neural continuum provides a valuable tool that needs to be translated into a product that online video publishers and advertisers could benefit from.

In another aspect of the present disclosure, the experimental methods of the mental and neural codes for the valence of images are translated into a tractable model capable of generating reliable predictions.

DETAILED DESCRIPTION OF THE INVENTION

Figure 1:
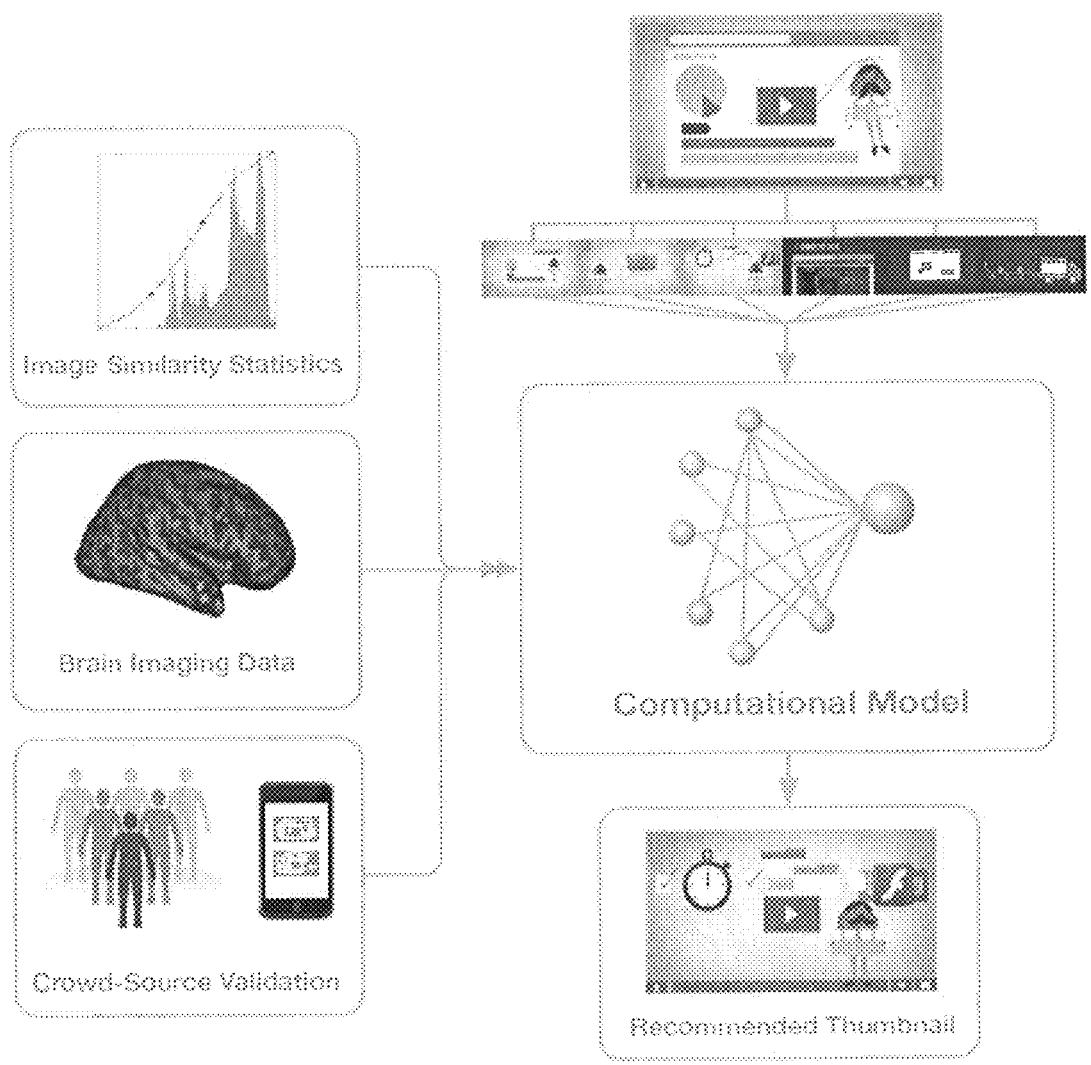
FIG. 1. The right-hand side of the diagram illustrates how the thumbnails are extracted from a stream of video and run through a computational model, which outputs a recommended thumbnail. The left three boxes represent the components of the computational model.

In one embodiment, a crowd-compute model is used to predict the most visually appealing thumbnail from a stream of video (FIG. 1). This system is a computationally intensive model that integrates Affective Valence perceptions, big data, computer vision, and machine learning.

In one example, the thumbnail extractor model is a weighted average crowd-compute model with three weights: [1] the perception of valence (behavior), [2] the neural representation of valence (brain), and [3] the crowd-sourced perception of valence. To generate the behavioral weight, in one embodiment, a database is used containing a large number of thumbnails along with their perceived valence scores. To estimate the valence of a thumbnail, image similarity metrics are used to match the novel thumbnail to the most similar thumbnails in the database. To generate the brain weight, a similar technique is used, except the database of thumbnails is tied to their associated neural responses as estimates of perceived valence.

In one example, participants are 18-60 years old with normal or corrected-to-normal vision. MRI participants are right handed and screened for neurological and psychiatric disorders in addition to method-specific contraindications for participation in MRI.

In one example, behavioral data is collected for thumbnails from videos, where thumbnails are defined as colored photographic screenshots, in one example, that range in size. Thumbnails represent, in one example, the following categories: news, sports, TV, music, education, user-generated content, screencasts, demonstration videos, marketing, and advertising. In one example, MR data is collected on a number of representative thumbnails from each of the different categories listed above.

In one example, behavioral data is collected via online crowd-sourcing platforms, in one example, Mechanical Turk, where large amounts of human response data can be acquired rapidly from a variety of different demographics.

In one example, the perceived valence of the thumbnails is measure using a version of the "Birthday Task," which has been used previously to predict the valence of everyday objects and their underlying neural representation. On any given trial, participants are presented with three thumbnails from the same video and asked to click the video they would most like to watch. This part of the experiment is repeated a second time, except participants are asked to click the video they would least like to watch (order counter-balanced across participants). Each triplet is presented for, in one example, less than 1000 ms multiplied by the number of images that appear in the triplet, and video frames are repeated in unique triplets, in each condition to establish response consistency. The most and least conditions are designed to index positive and negative dimensions of valence, respectively.

In one example, data is analyzed using a statistical software package. To calculate a valence score for each thumbnail, the difference is taken between the number of times a particular frame is selected in the most condition from the number of times it is selected in the least condition. The valence of each thumbnail for each participant is calculated, in addition to averaging individual participants' scores to generate a single average group score for each thumbnail. In one embodiment, the model is able to dynamically adjust the group average score for each thumbnail based on set parameters. For example, the group score can be calculated from all participants' data, or only a subset based on specified age ranges or other demographics. This allows the model to predict the best thumbnail for different user demographic groups.

In one example, the fMRI experiment is used to generate a score that contains a valence and strength value for each thumbnail based on their underlying neural response. In one example, a computer programming language is used to conduct the experiment. Thumbnails are presented on, in one example, an MR-compatible high-resolution 24-inch LCD visual display (e.g., Cambridge Research BOLD-Screen) that participants view through a mirror attached to the head coil. Participants see a thumbnail centered on a black screen for a period of time less than 1500 ms, and are asked to rate the thumbnail for pleasantness on a continuous number scale that can vary from 1-10. This attention task has been in a previous fMRI experiment that successfully located the cortical region that represents the continuous perception of valence. Button responses are recorded using an MR-compatible response glove or button box. Participants are able to respond while the thumbnail is on the screen or during a response window. Experimental trials will be structured to maximize signal and minimize noise based on standard functional MRI practices. After the fMRI part of the experiment, each participant will complete a series of demographic questions.

In one example, whole brain imaging is performed using, in one example, a Siemens 3T Verio MR scanner equipped with 32-channel phase-array head coil. Head motion is minimized using the MR center's head restraint system. A high-resolution T1-weighted 3D MPRAGE anatomical image is taken (e.g., 1 mm isotropic voxels; 40 slices) followed by functional images collected using a gradient echo, echo-planar sequence (e.g., TR=1900 ms, TE=2.98 ms). Prior to preprocessing, in-depth data quality checks are performed on every subject to identify the presence of excessive head motion or rare signal artifacts. Participants that move more than 3 mm are excluded from analysis. EPI images are corrected for slice time acquisition, motion, normalized to standard space (Talairach), and spatially smoothed with an 8 mm FWHM isotropic Gaussian kernel.

In one example, functional data is analyzed using, for example, SPM8 to construct a within-subject statistical model under the assumptions of the general linear model. To compare activation across experimental conditions, effects are estimated using a subject-specific fixed effects model with session effects treated as confounds. To compare individual subject effects, the estimates are entered into a second-level group analysis where subject becomes a random effect. The statistical test is a one-sample t-test against a contrast value of zero for each voxel. The whole brain contrasts are supported by region of interest (ROI) analyses that show quantitative changes in signal in a specified region.

In one example, a Region of Interest (ROI) analysis is conducted using, for example, the SPM8 ROI MARSBAR Toolbox. ROIs are defined anatomically based on co-ordinates from supporting work, and functionally using unbiased contrasts. A region that is centered in the right Inferior Frontal Sulcus is selected using the MNI co-ordinates from our previous study where we located valence processing and extracted evidence for the valence continuum. ROIs include voxels within, for example, an 8 mm radius extending from the center of the defined region. Selective averaging will permit extraction of peak percent signal changes associated with each condition. In this analysis, each thumbnail is treated as a condition by averaging across the thumbnail repetitions. In addition, the integrated percent signal change is extracted for each thumbnail. ROI data is visualized using, for example, MATLAB and Prism. Whole brain data is visualized using a combination of, for example, MRICRON and the SPM Surfrend Toolbox.

In one example, thumbnails with a stronger BOLD response in the Inferior Frontal Sulcus and surrounding regions in the prefrontal cortex have a more positive perceive valence, meaning that users are more likely to click on them.

In one embodiment, a stream of novel thumbnails (e.g., a video) are mapped into the behavioral and brain thumbnail spaces established using the above methods. In one example, Scene Gist14 (Leeds, D. D., D. A. Seibert, J. A. Pyles, and M. J. Tarr. "Unraveling the Visual and Semantic Components of Object Representation." 11th Annual Meeting of the Vision Sciences Society. Poster. May 6, 2011. Address) is used to match a novel thumbnail probe to reference thumbnails with known valences in the brain and behavior databases. Scene Gist works by representing each image as a weighted set of components (derived from Principle Component Analysis), where each component captures a common spatial frequency property of natural scenes. Features are considered component weights. Unlike many other image representational approaches in computer vision, Scene Gist incorporates color (which may be a critical component in the perception of valence). Overall, it is designed to model the early stages of visual processing that are active when you first encode the gist of a scene, rather than individual objects, which is critical for matching scenes in thumbnail images.

In one embodiment, the thumbnail extractor model works by using Scene Gist to match the probe thumbnail to the set of closest reference thumbnails in both the brain and the behavioral databases. With respect to the brain database, once Scene Gist has identified the closest reference thumbnail, the probe assigns a valence score based on those of the reference thumbnails. This score provides the brain weight in the model. There is, however, the potential that Scene Gist maps the probe thumbnail to reference thumbnails of very different valences. Therefore, the weight given to each database within the model considers the variance within the reference set in image matching success. This means that if the probe thumbnail maps to various reference thumbnails with conflicting valences, the variance is high and the overall weight on the brain database for that particular probe thumbnail would be low, thereby controlling for potentially erroneous predictions.

In one example, in order to validate predictions from the brain and behavioral databases, a valence perception for the probe thumbnail is crowd sourced. This constitutes the third weight in the crowd-compute model. The crowd sourcing is a shortened version of the Birthday Task described earlier. This allows for rapid validation of thumbnail prediction across a number of participants.

Weights for the brain and behavioral database vary as a function of the variance in the performance of Scene Gist. In one example, weights for each component are trialed and tested by setting initial weights, monitoring real-world click rates, and adjusting them based on the click data. Once the weights have been set, the overall prediction score for a given thumbnail is comprised of the weighted average of the three model components. This weighted score changes based on the demographic information that is parsed through the model based on the customers' requests.

In one embodiment, the system can deliver thumbnails specific to different user groups. In one example, demographic variables that customers use are used to define their user groups so that the same data can be collected from participants contributing to the databases. With this information, the model can be selectively restricted to search for a thumbnail based on the specific demographics. In one example, the system selects a sport thumbnail for Caucasian males between the ages of 40 and 60 that often watch cricket. To achieve dynamic, user-specific predictions, a battery of questions is formulated that include questions on age, gender, race, ethnicity, education level, income, interests, hobbies, most-visited websites, social network participation, daily TV usage, daily online usage, and estimated online video viewing frequency. These demographic questions are augmented with customer-supplied questions that together are used to define users so that our product can most effectively generate targeted thumbnail selections.

In one embodiment, computer vision methods are used to extract more fine-grained descriptors of each frame, including but not limited to semantics, color composition, complexity, people, and animals (the number of descriptors is limited to the robustness of the different methods available).

In one embodiment, using frames that have been tagged for valence through crowd-sourcing, several computational tools are then used to explore which of these descriptors explain the greatest amount of variance in valence. In one example, split-half, test-generalize methods are used to establish the efficacy of this piecewise approach to predicting valence.

The system can be used in various applications. Editorial video, for example, includes TV shows, movies, webisodes, trailers, and clips from major commercial broadcasting networks such as NBC, Fox, ABC, ESPN, and CNN. The utility of the present invention for owners of editorial videos is in part that increased click rates means increased time spent on the site, user engagement, and advertising revenue.

In one example, the system can be used in video marketing and advertising. The popularity of online video reflects its potential to serve as a mass market medium, and as a new tool for brands to reach consumers. Videos in the marketing segment range from traditional video ads placed as content, to product demonstrations and tutorial videos. Each of these types of marketing videos have been shown to increase conversion rates, brand loyalty, and for internet retailers, sales and basket sizes.

In one example, the system can be used as an educational video. This is a growing segment of the online video industry.

Figure 2:
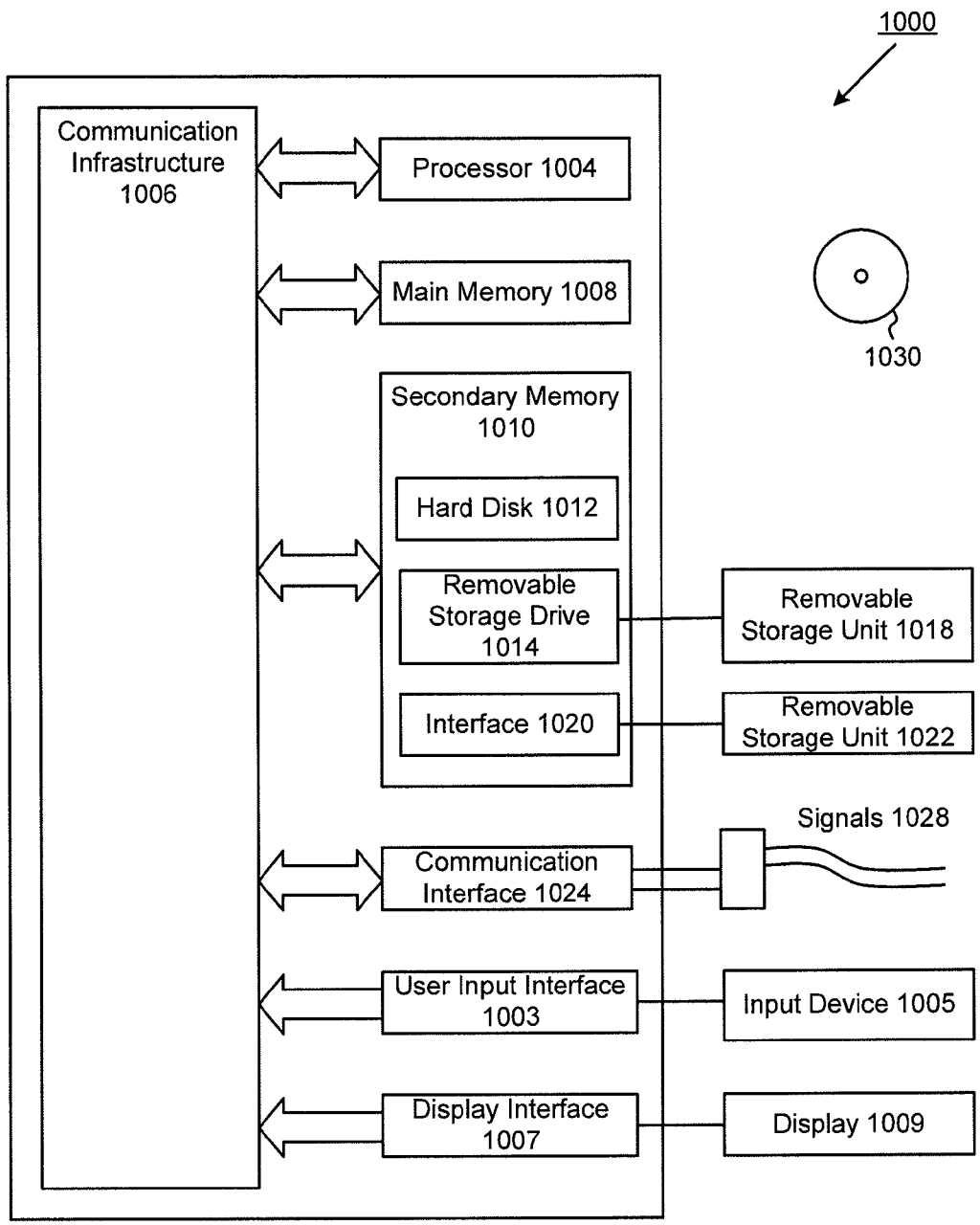
FIG. 2 is a diagram of an example of a computer system on which one or more of the functions of the embodiment may be implemented.

A system for performing the described functions can comprise a general purpose computer configured in a known manner to perform the functions. Entities for performing the functions described can reside in a single processor so configured or in separate processors, e.g., an analysis processor, in identification processor, a designation processor, a calculation processor, a video display processor, a video frame analysis processor, a valence data processor, and the like. These entities may be implemented by computer systems such as computer system 1000 as shown in FIG. 2, shown by way of example. Embodiments of the present invention may be implemented as programmable code for execution by such computer systems 1000. After reading this description, it will become apparent to a person skilled in the art how to implement the invention using other computer systems and/or computer architectures, including mobile systems and architectures, and the like.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network).

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touch screen such as a resistive or capacitive touch screen, etc.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fiber optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

It will be understood that embodiments of the present invention are described herein by way of example only, and that various changes and modifications may be made without departing from the scope of the invention.

In the embodiment described above, the mobile device stores a plurality of application modules (also referred to as computer programs or software) in memory, which when executed, enable the mobile device to implement embodiments of the present invention as discussed herein. As those skilled in the art will appreciate, the software may be stored in a computer program product and loaded into the mobile device using any known instrument, such as removable storage disk or drive, hard disk drive, or communication interface, to provide some examples.

As a further alternative, those skilled in the art will appreciate that the hierarchical processing of words or representations themselves, as is known in the art, can be included in the query resolution process in order to further increase computational efficiency.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

The claimed system can be embodied using a processing system, such as a computer, having a processor and a display, input devices, such as a keyboard, mouse, microphone, or camera, and output devices, such as speakers, hard drives, and the like. This system comprises means for carrying out the functions disclosed in the claims (Means for exposing, means for calculating, means for storing, means for providing, means for correlating, etc.).

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention. Further, although the present invention has been described with respect to specific preferred embodiments thereof, various changes and modifications may be suggested to one skilled in the art and it is intended that the present invention encompass such changes and modifications as fall within the scope of the appended claims.

REFERENCES

1. Lebrecht, S., Bar, M., Barrett, L. F. & Tarr, M. J. Micro-Valences: Perceiving Affective Valence in Everyday Objects. *Frontiers in Psychology* 3, (2012).
2. Russell, J. A. A circumplex model of affect. *Journal of personality and social psychology* 39, 1161-1178 (1980).
3. Greenwald, A. G., McGhee, D. E. & Schwartz, J. L. Measuring individual differences in implicit cognition: the implicit association test. *J Pers Soc Psychol* 74, 1464-1480 (1998).
4. Avero, P. & Calvo, M. G. Affective priming with pictures of emotional scenes: the role of perceptual similarity and category relatedness. *Span J Psychol* 9, 10-18 (2006).
5. Calvo, M. G. & Avero, P. Affective priming of emotional pictures in parafoveal vision: Left visual field advantage. *Cognitive, Affective, & Behavioral Neuroscience* 8, 41 (2008).
6. Rudrauf, D., David, O., Lachaux, J. P., Kovach, C. K., et al. Rapid interactions between the ventral visual stream and emotion-related structures rely on a two-pathway architecture. *J Neurosci* 28, 2793-2803 (2008).
7. Colibazzi, T., Posner, J., Wang, Z., Gorman, D., et al. Neural systems subserving valence and arousal during the experience of induced emotions. *Emotion* 10, 377-389 (2010).
8. Weierich, M. R., Wright, C. I., Negreira, A., Dickerson, B. C. & Barrett, L. F. Novelty as a dimension in the affective brain. *Neuroimage* 49, 2871-2878 (2010).
9. Lebrecht, S. & Tan, M. Defining an object's micro-valence through implicit measures. *Journal of Vision* 10, 966 (2010).
10. Lebrecht, S., Bar, M., Sheinberg, D. L. & Tan, M. J. Micro-Valence: Nominally neutral visual objects have affective valence. *Journal of Vision* 11, 856-856 (2011).
11. Lebrecht, S., Johnson, D. & Tan, M. J. [in revision] The Affective Lexical Priming Score. *Psychological Methods*.
12. Lang, P. J., Bradley, M. M. & Cuthbert, B. N. International affective picture system (IAPS): Technical manual and affective ratings. *NIMH Center for the Study of Emotion and Attention* (1997).
13. Leeds, D. D., D. A. Seibert, J. A. Pyles, and M. J. Tarr. "Unraveling the Visual and Semantic Components of Object Representation." 11*th Annual Meeting of the Vision Sciences Society*. Poster. May 6, 2011. Address.
14. Oliva, A. & Torralba, A. Modeling the shape of the scene: A holistic representation of the spatial envelope. *International Journal of Computer Vision* 42, 145-175 (2001).
15. Verna, Paul. "Top Digital Trends for 2012." *Top Digital Trends for* 2012. December, 2011. http://www.theaimagency.com/wp-content/uploads/2012/03/15111_eMarketer_Top_Digital_Trends_2012.pdf.
16. "ComScore Releases April 2012 U.S. Online Video Rankings." May 18, 2012. comScore. Web. 15 Jun. 2012. <http://www.comscore.com/Press_Events/Press_Releases/2012/5/comScore_Releases_April_2012_U.S._Online_Video_Rankings.
17. *IAB Internet Advertising Revenue Report*. 2007 Full Year Results. PricewaterhouseCoopers, May 23, 2008. http://www.iab.net/media/file/IAB_PwC_2007_full_year.pdf.
18. *IAB Internet Advertising Report*. 2011 Full Year Results. PricewaterhouseCoopers, Apr. 18, 2012. <http://www.iab.net/media/file/IAB_Internet_Advertising_Revenue_Report_FY_2011.pdf.
19. VanBoskirk, Shar. *US Interactive Marketing Forecast, 2011 to 2016*. Forrester Research, Aug. 24, 2011.
20. "ComScore Launches Video Metrix 2.0 to Measure Evolving Web Video Landscape." ComScore announces improvements to video measurement service and releases Video Metrix rankings for June 2010. Jul. 15, 2010. comScore. Web. 15 Jun. 2012. http://www.comscore.com/Press_Events/Press_Releases/2010/7/comScore_Launches_Video_Metrix_2.0_to_Measure_Evolving_Web_Video_Landscape.
21. *Explosive Online Video Growth Coming From Greater Engagement Around Premium Programming*. Interview with Eli Goodman, comScore Media Evangelist, from Beet.TV's 2012 Executive Retreat. Video. Beet.TV Executive Retreat, Vieques, Puerto Rico: Beet.TV, Mar. 29, 2012. Print. http://www.beet.tv/2012/03/comscore-eli-goodman.html.

22. *Digital Video Advertising Trends:* 2012. An annual study examining growth in digital video advertising. Break Media, 2011.
23. *Changing the Way You Shop for Shoes.* Interview with Zappos.com's Senior Manager Rico Nasol on how the retailer is using streaming video to boost sales. Video. Streaming Media West: FOXBusiness.com, Dec. 4, 2009. http://video.foxbusiness.com/v/3951649/changing-the-wayyou-shop-for-shoes/.

We claim:

1. An automated method for determining an optimal video frame from a video stream comprising a plurality of video frames generating affective perceptions, the method comprising:
    analyzing, via a processing device, each of said video frames to identify frames containing content generating neutral affective perceptions;
    analyzing, via a processing device, each of said video frames containing content generating neutral affective perceptions to obtain data indicative of a desired property for each video frame containing content generating neutral affective perceptions;
    identifying one or more of said video frames containing content generating neutral affective perceptions having a level of said desired property above a predetermined threshold level; and
    designating the one or more identified video frames as the optimal video frames.

2. The method of claim 1, wherein said data indicative of a desired property comprises valence data.

3. The method of claim 2, wherein said identified video frames comprise the video frames having a positive Affective Valence above a predetermined threshold level.

4. The method of claim 3, wherein said the Affective Valence is determined by:
    exposing at least one individual, via a processing device, to at least one valence-measuring paradigm in which the at least one individual is exposed to a said plurality of video frames and is required to provide a response directed to at least one of said video frames;
    calculating a valence value for each of said plurality of video frames based on each response; and
    storing each valence value in a storage medium, wherein said response and a speed within which said response was given enables an inference to be made regarding an implicit attitude of the individual towards said at least one of said plurality of video frames.

5. The method of claim 4, wherein the stored valence values are used to predict how individuals will react to being exposed to video frames to which they may not have been previously exposed.

6. The method of claim 4, wherein said at least one individual is exposed, via a processing device, to multiple valence-measuring paradigms, in each of which the at least one individual is exposed to a plurality of video frames and provides a response directed to at least one of said plurality of video frames;
    calculating a valence value for each of said plurality of video frames based on each response; and
    storing each valence value in a storage medium.

7. The method of claim 6, comprising a first valence-measuring paradigm that includes a behavioral valence measuring technique and a second valence measuring paradigm that includes a neuroimaging valence measuring technique.

8. The method of claim 7, wherein valence values for a particular one of said video frames for each of said paradigms are correlated, thereby providing a basis for assessing a confidence level of the valence values for said particular one of said video frames.

9. The method of claim 8, wherein the correlated valence values are used to give a distributed representation of valence.

10. The method of claim 4, wherein said at least one valence-measuring paradigm comprises a behavioral valence measuring technique.

11. The method of claim 4, wherein said at least one valence-measuring paradigm comprises a neuroimaging valence measuring technique.

12. The method of claim 4, wherein said at least one valence-measuring paradigm measures a positive dimension of valence.

13. The method of claim 4, wherein said at least one valence-measuring paradigm measures a negative dimension of valence.

14. An automated system for determining an optimal video frame from a video stream comprising a plurality of video frames generating affective perceptions, comprising a processor configured to:
    analyze, via a processing device, each of said video frames to identify frames containing content generating neutral affective perceptions;
    analyze each of said video frames containing content generating neutral affective perceptions to obtain data indicative of a desired property for each video frame containing content generating neutral affective perceptions;
    identify one or more of said video frames containing content generating neutral affective perceptions having a level of said desired property above a predetermined threshold level; and
    designate the one or more identified video frames as the optimal video frames.

15. The system of claim 14, wherein said data indicative of a desired property comprises valence data.

16. The system of claim 15, wherein said identified video frames comprise the video frames having a positive Affective Valence above a predetermined threshold level.

17. The system of claim 16, wherein said the Affective Valence is determined by a processing device configured to:
    expose at least one individual to at least one valence-measuring paradigm in which the at least one individual is exposed to a said plurality of video frames and is required to provide a response directed to at least one of said video frames;
    calculate a valence value for each of said plurality of video frames based on each response; and
    store each valence value in a storage medium, wherein said response and a speed within which said response was given enables an inference to be made regarding an implicit attitude of the individual towards said at least one of said plurality of video frames.

18. The system of claim 17, wherein the stored valence values are used to predict how individuals will react to being exposed to video frames to which they may not have been previously exposed.

19. The system of claim 17, wherein said at least one individual is exposed, via a processing device, to multiple valence-measuring paradigms, in each of which the at least one individual is exposed to a plurality of video frames and provides a response directed to at least one of said plurality of video frames, said processing device further configured to;

calculate a valence value for each of said plurality of video frames based on each response; and store each valence value in a storage medium.

20. The system of claim 19, wherein a first valence-measuring paradigm includes a behavioral valence measuring technique and a second valence measuring paradigm includes a neuroimaging valence measuring technique.

21. The system of claim 20, wherein valence values for a particular one of said video frames for each of said paradigms are correlated, thereby providing a basis for assessing a confidence level of the valence values for said particular one of said video frames.

22. The system of claim 21, wherein the correlated valence values are used to give a distributed representation of valence.

23. The system of claim 17, wherein said at least one valence-measuring paradigm comprises a behavioral valence measuring technique.

24. The system of claim 17, wherein said at least one valence-measuring paradigm comprises a neuroimaging valence measuring technique.

25. The system of claim 17, wherein said at least one valence-measuring paradigm measures a positive dimension of valence.

26. The system of claim 17, wherein said at least one valence-measuring paradigm measures a negative dimension of valence.

* * * * *